(12) United States Patent
Ainslie et al.

(10) Patent No.: US 8,411,112 B1
(45) Date of Patent: Apr. 2, 2013

(54) SYSTEMS AND METHODS FOR GENERATING AN ICON

(75) Inventors: Alex Neely Ainslie, San Francisco, CA (US); David Trainor, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/179,455

(22) Filed: Jul. 8, 2011

(51) Int. Cl.
*G09G 5/00* (2006.01)
(52) U.S. Cl. ........ 345/629; 345/589; 345/593; 345/595; 345/619; 715/762; 715/763; 715/837; 382/165; 382/170
(58) Field of Classification Search .................. None
See application file for complete search history.

(56) References Cited

U.S. PATENT DOCUMENTS

| | | | |
|---|---|---|---|
| 7,715,624 B2* | 5/2010 | Nishida | 382/170 |
| 8,237,736 B2 | 8/2012 | Flick | |
| 2008/0052637 A1* | 2/2008 | Ben-Yoseph et al. | 715/800 |
| 2010/0050120 A1 | 2/2010 | Ohazama et al. | |
| 2010/0322300 A1* | 12/2010 | Li et al. | 375/240.01 |

OTHER PUBLICATIONS

"Instant Eyedropper: Identify HTML-color code from any pixel of the screen with single-click and auto paste it to the clipboard." url: http://www.instant-eyedropper.com. Verified to date Nov. 8, 2006 via Internet Archive.org using url http://web.archive.org/web/20061108101235/http://instant-eyedropper.com/.*
"Introduction to Adobe Photoshop" Wesley A. Fryer and Mark Umstot. Accessed via the web at http://www.wtvi.com/teks/ps/. Last updated Jun. 30, 2005. Date accessed Jan. 3, 2012.*
"Learn how to make a screenshot / take-a-screenshot.org." url: http://take-a-screenshot.org. Verified to date Apr. 10, 2008 via Internet Archive.org using http://wayback.archive.org/web/20070715000000*/http://take-a-screenshot.org/.*
"favicon.ico Generator," http://www.favicon.cc accessed Aug. 1, 2012 via "Internet archive" via http://web.archive.org/web/20100701165946/http://www.favicon.cc/ showing earlier website archive date of Jul. 1, 2010.*
"Instant Eyedropper: Identify HTML-color code from any pixel of the screen with single-click and auto paste it to the clipboard", verified to date Nov. 8, 2006 via Internet Archive.org, retrieved from <http://web.archive.org/web/20061108101235/http://instant-eyedropper.com>.
Fryer et al., "Introduction to Adobe Photoshop", Jun. 30, 2005, retrieved from <http://www.wtvi.com/teks/ps/>.

* cited by examiner

*Primary Examiner* — Antonio A Caschera
(74) *Attorney, Agent, or Firm* — McDermott Will & Emery LLP

(57) ABSTRACT

The subject technology provides a computer-implemented method for icon generation according to one aspect. The method comprises determining a color from a first icon, generating a colored region comprising the determined color, and generating a composite image of the colored region and the first icon to produce a second icon, wherein the second icon is larger than the first icon.

8 Claims, 8 Drawing Sheets

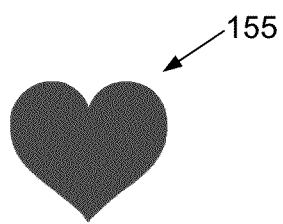
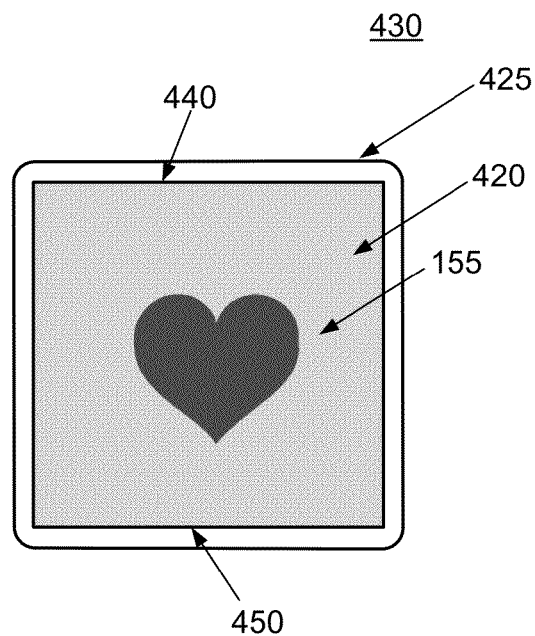
FIG. 4A       FIG. 4B

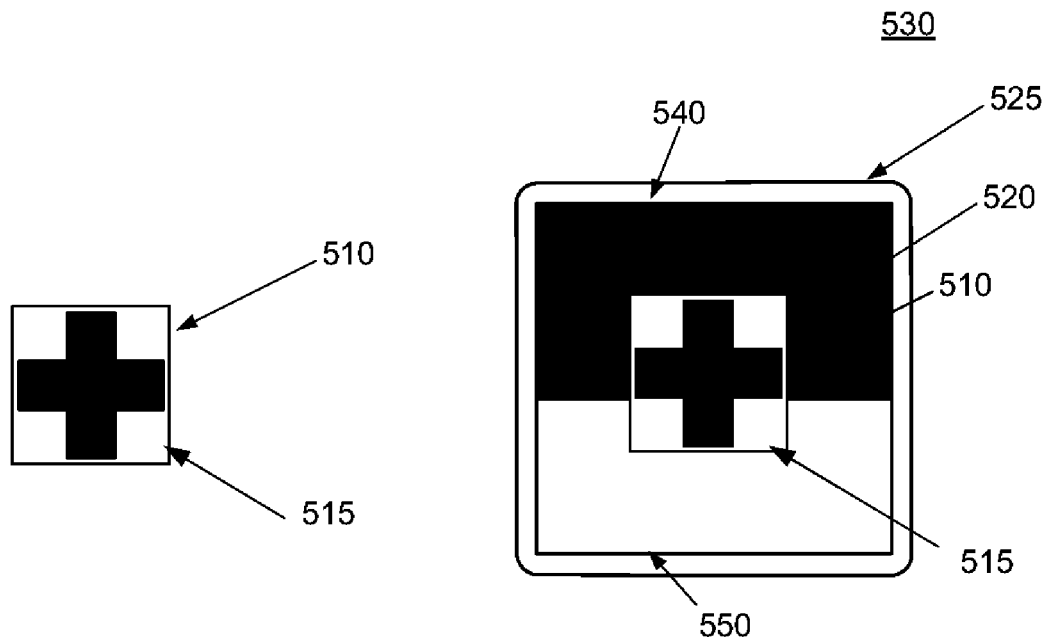
FIG. 5A
FIG. 5B
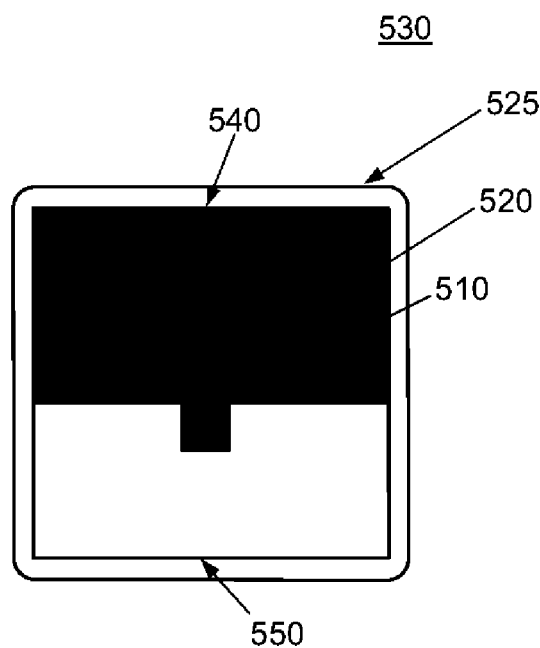
FIG. 5C

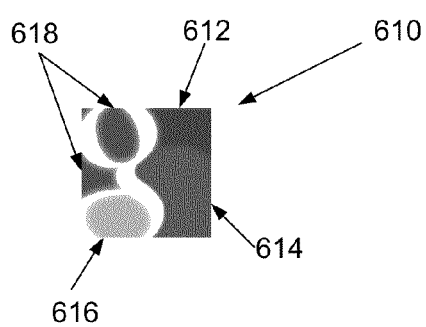 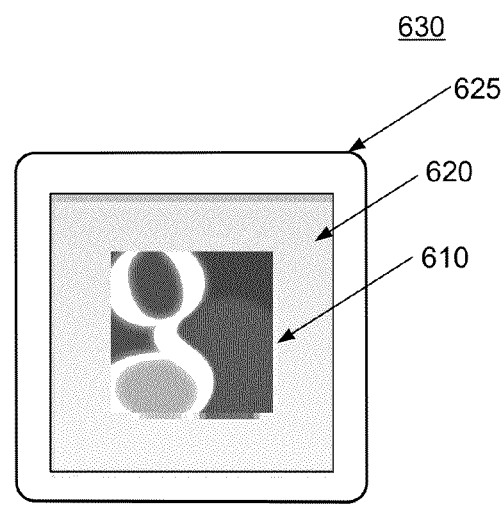
FIG. 6A  FIG. 6B

US 8,411,112 B1

SYSTEMS AND METHODS FOR GENERATING AN ICON

FIELD

The subject disclosure generally relates to icons, and, in particular, to systems and methods for generating an icon.

BACKGROUND

A website may be represented on a screen by a small icon (e.g., favicon). For example, in a web browser, the small icon may appear in the address bar, bookmark and/or tab of the browser, in which the user may access the corresponding website by clicking on the small icon. The web browser may retrieve the small icon using a link to the small icon provided by the website, and/or other method.

SUMMARY

A computer-implemented method for icon generation is disclosed according to one aspect of the subject technology. The method comprises determining a color from a first icon, generating a colored region comprising the determined color, and generating a composite image of the colored region and the first icon to produce a second icon, wherein the second icon is larger than the first icon.

A system for icon generation is disclosed according to one aspect of the subject technology. The system comprises one or more processors, and a machine-readable medium comprising instructions stored therein, which when executed by the one or more processors, cause the one or more processors to perform operations. The operations comprise determining a color from a first icon, wherein the first icon represents a website. The operations also comprise generating a colored region comprising the determined color, and generating a composite image of the colored region and the first icon to produce a second icon, wherein the second icon is larger than the first icon.

A machine-readable medium is disclosed according to one aspect of the subject technology. The machine-readable medium comprises instructions stored therein, which when executed by a machine, cause the machine to perform operations. The operations comprise determining a color from a first icon, generating a colored region comprising the determined color, adjusting an attribute of the determined color within the colored region, and generating a composite image of the colored region and the first icon to produce a second icon, wherein the second icon is larger than the first icon.

A computer-implemented method for icon generation is disclosed according to one aspect of the subject technology. The method comprises determining a color from a first icon, generating a colored region comprising the determined color, acquiring a screenshot of a webpage, and generating a composite image of the colored region and the screenshot to produce a second icon.

A system for icon generation is disclosed according to one aspect of the subject technology. The system comprises one or more processors, and a machine-readable medium comprising instructions stored therein, which when executed by the one or more processors, cause the one or more processors to perform operations. The operations comprise determining a color from a first icon, wherein the first icon represents a website. The operations also comprise generating a colored region comprising the determined color, and acquiring a screenshot of a webpage, wherein the webpage is from the website. The operations further comprise generating a composite image of the colored region and the screenshot to produce a second icon.

A machine-readable medium is disclosed according to one aspect of the subject technology. The machine-readable medium comprises instructions stored therein, which when executed by a machine, cause the machine to perform operations. The operations comprise determining a color from a first icon, generating a colored region comprising the determined color, acquiring a screenshot of a webpage, and generating a composite image of the colored region, the screenshot and the first icon to produce a second icon.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

FIG. 4A shows an example of a small icon.

FIG. 4B shows a large icon generated from the small icon in FIG. 4A according to an aspect of the subject technology.

FIG. 5A shows another example of a small icon.

FIG. 5B shows a large icon generated from the small icon in FIG. 5A according to an aspect of the subject technology.

FIG. 5C shows the large icon in FIG. 5B, in which a white box surrounding the small icon has been removed according to an aspect of the subject technology.

FIG. 6A shows an example of a small icon with multiple colors.

FIG. 6B shows a large icon generated from the small icon in FIG. 6A according to an aspect of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Figure 1:
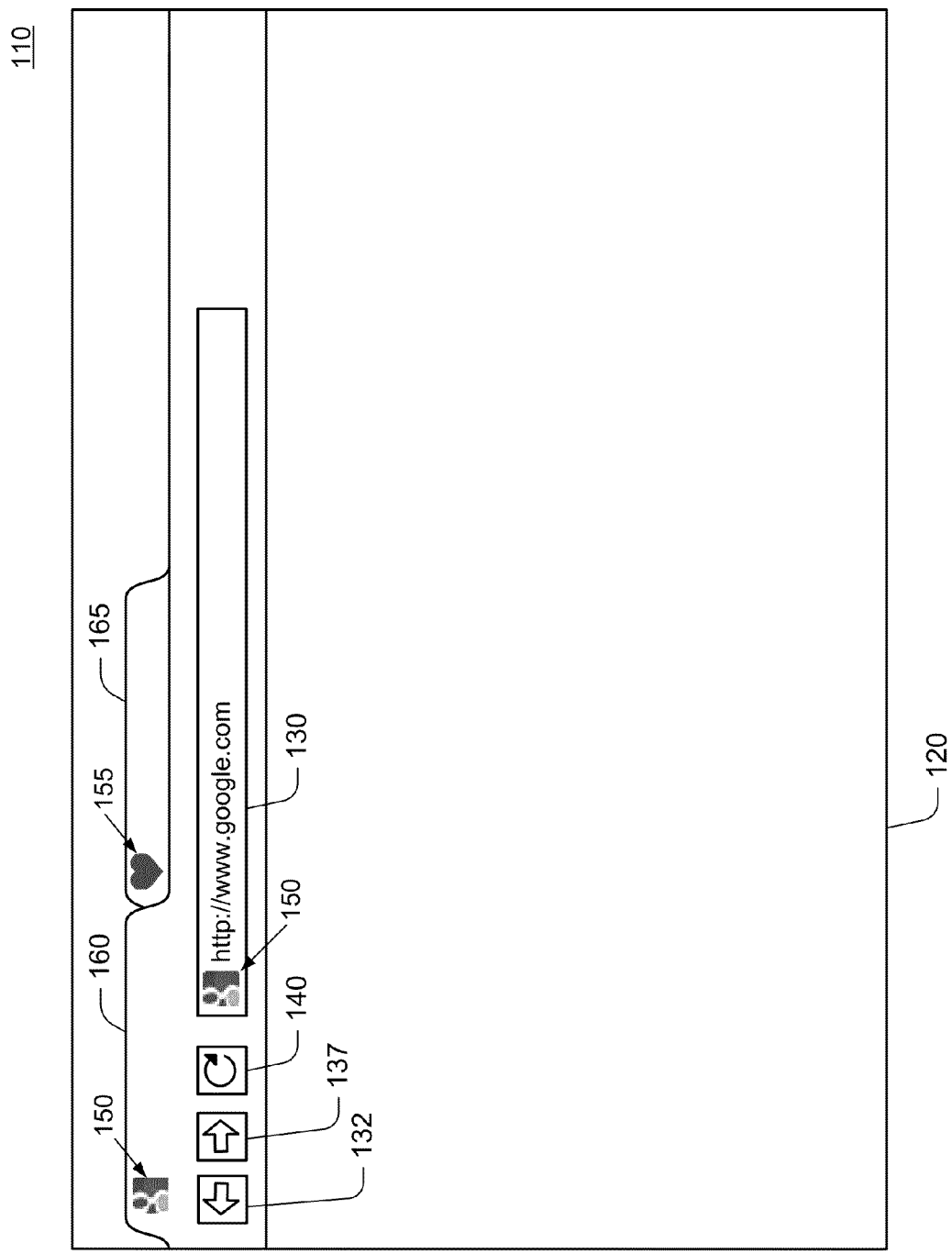
FIG. 1 shows an example of a web browser on a screen.

FIG. 1 shows an example of a web browser 110 on a screen. The web browser 110 includes an address bar 130, a browser window 120, and one or more tabs 160 and 165. The address bar 130 may display the uniform resource identifier (URL) of the current website displayed in the browser window 120. The user may also access a particular website by typing the URL of the website into the address bar 130. The tabs 160 and 165 indicate the websites that are currently available on the web browser 110. The web browser 110 may also include a back button 132, a forward button 137 and a refresh button 140.

As shown in the example in FIG. 1, the web browser 110 may display small icons 150 and 155 (e.g., favicons), where each small icon 150 and 155 represents a particular website. The web browser 110 may retrieve the small icon for a particular website using a link to the small icon provided by the website, and/or other method.

FIG. 1 shows an example of small icons 150 and 155 displayed in the address bar 130 and the tabs 160 and 165 of the web browser 110. The small icon 150 in the address bar 130 may represent the current website displayed in the browser window 120. The small icon 150 and 155 in each tab 160 and 165 may represent the website corresponding to the tab. For example, the user may use the small icons 150 and 155 in the tabs 160 and 165 to quickly identify which tab 160 and 165 corresponds to a particular website. After identifying the corresponding tab, the user may view the website by clicking on the tab. Although two tabs 160 and 165 are shown in the example in FIG. 1, those skilled in the art will appreciate that any number of tabs may be open at a time. A small icon may also be displayed in a bookmark to represent the corresponding website in the bookmark. In addition, a small icon may be displayed on a desktop or in an application to provide a shortcut to the corresponding website.

When a small icon is displayed on a large screen of a desktop or laptop computer, the user can precisely point to and click on the small icon using a mouse or track pad. However, when the small icon is displayed on a computing device with a small screen (e.g., mobile device), the small icon may be greatly reduced in size. In addition, for a computing device comprising a touch screen, the user may have greater difficulty pointing to and clicking on a small icon using a finger on the touch screen. As a result, the user may have difficulty viewing and/or clicking on the small icon when displayed on such devices. A small icon may be 16×16 pixels in size, for example.

One approach to address this problem is to stretch the dimensions of the small icon to make the icon larger, and therefore easier for the user to click on. However, simply stretching the small icon may result in a large icon that appears fuzzy and/or pixilated.

To address this problem, systems and methods according to various aspects of the subject technology automatically generate a large icon to represent a website represented by a small icon. In one aspect, the large icon is generated by determining one or more colors from the small icon, generating a colored region comprising the one or more determined colors, and generating a composite image of the small icon and the colored region to produce the large icon. The large icon may then be used to represent the corresponding website (e.g., on the small screen of a mobile device) instead of the original small icon. The large icon advantageously provides the user with a larger area to click on to access the corresponding website. Further, since the large icon incorporates one or more colors from the small icon, which the user may already associate with the corresponding website, the user can visually distinguish the large icon from other icons representing other websites based on color.

Figure 2:
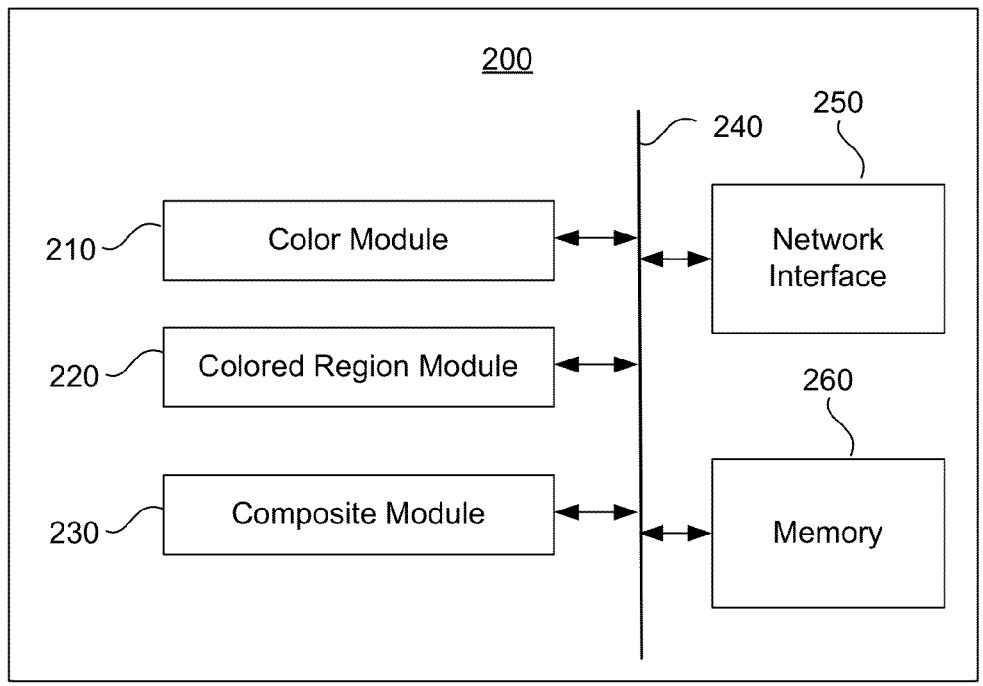
FIG. 2 is a conceptual block diagram of a system according to an aspect of the subject technology.

FIG. 2 shows a system 200 according to an aspect of the subject technology. The system 200 includes a color module 210, a colored region module 220, and a composite module 230. The modules may communication with one another via a bus 240 or other communication structure. The system 200 may also include a network interface 250 that allows one or more of the modules to communicate with a server and/or a computing device over a network connection. The system 200 may also include memory 260, which may be shared by the modules and used to pass information between the modules. The memory 260 may also be used to pass information between one of the modules and an internal device of the system 200. The modules may be implemented as a set of machine-readable instructions that are stored in a memory and executed by a processor to perform the various processes described herein.

In one aspect, the color module 210 is configured to receive a small icon representing a website and determine one or more colors from the small icon. The color module 210 may retrieve the small icon via the network interface 250 using a link provided by the website.

The color module 210 may determine a color from the small icon using various approaches. In one approach, the color module 210 may apply a clustering algorithm (e.g., k-means clustering algorithm) to the pixels of the small icon to group the pixels into a plurality of clusters based on their colors. The color module 210 may then select the cluster with the largest number of pixels, and compute a mean color of the pixels in the selected cluster. An example of this approach will now be discussed with reference to FIG. 3.

Figure 3:
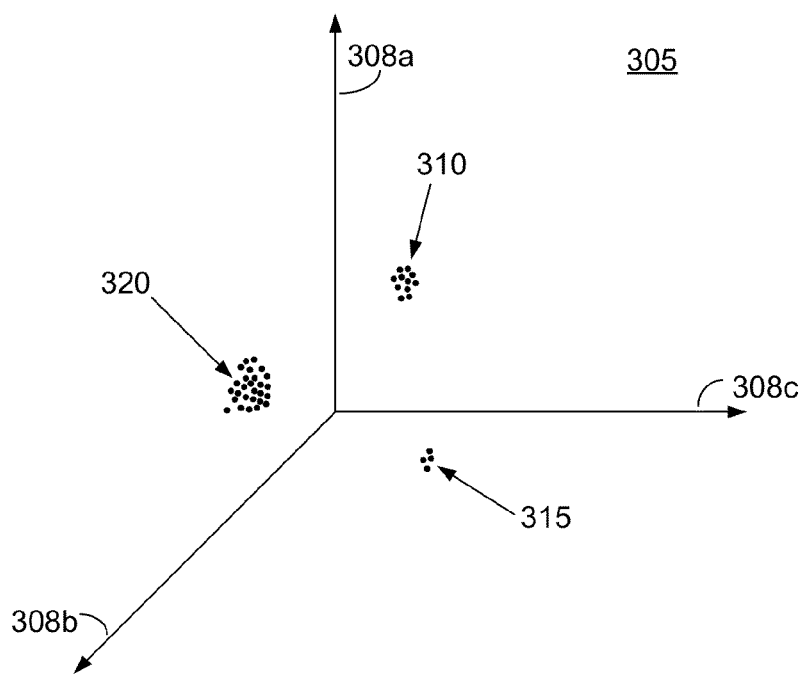
FIG. 3 illustrates a clustering algorithm for determining a color from an icon according to an aspect of the subject technology.

In one aspect, the colors of the small icon may be defined using a color model. Examples of color models that may be used include a red-blue-green (RBG) color model, a hue-saturation-lightness (HSL) color model, a hue-saturation-value (HSV) color model, or other color model. In this aspect, the pixels of the small icon may be mapped to a three-dimensional color space 305 in which each axis 308a-308c corresponds to one of the three components in the color space, as shown in FIG. 3. The example in FIG. 3 only shows a few pixels for ease of illustration. For an example of a small icon having 16×16 pixels, up to 256 pixels may be mapped to the color space 305.

The color module 210 may apply a clustering algorithm (e.g., k-means clustering algorithm) to the pixels in the color space 305 to group the pixels into a plurality of clusters. The number of clusters may be a parameter of the clustering algorithm that can be determined empirically. In the example in FIG. 3, the clustering algorithm groups the pixels into a first cluster 310, a second cluster 315 and a third cluster 320, in which the third cluster 320 has the largest number of pixels. In this example, the color module 210 may determine a color from the small icon by selecting the cluster with the largest number of pixels (the third cluster 320 in FIG. 3), and determining the mean color of the pixels in the selected cluster (i.e., the centroid of the selected cluster). In another example, the color may be determined by selecting a color that is shared by the greatest number of pixels in the selected cluster.

Although three clusters are shown in the example in FIG. 3 for ease of illustration, it is to be understood that the pixels in the small icon may be grouped into any number of clusters.

The colored region module 220 is configured to generate a colored region comprising the color determined by the color module 210. The colored region is larger than the small icon, and may have a variety of different shapes including a square shape, a rectangular shape, a circular shape, or any other shape.

In one aspect, the colored region module 220 may adjust the determined color within the colored region to enhance contrast between the small icon and the colored region. For example, the colored region module 220 may desaturate the determined color within the colored region by a certain amount to achieve a desired contrast. The colored region module 220 may also adjust another attribute of the determined color in addition to or as an alternative to saturation including hue, illumination and/or other attribute.

In one aspect, the colored region module 220 may apply a gradient to the determined color within the color region to enhance the look of the large icon. For example, the gradient may vary one or more attributes (e.g., saturation) of the determined color as a function of position in the colored region. For example, the gradient may desaturate the determined color by an increasing amount in a direction moving from the top of the colored region to the bottom of the colored region. Examples of this are provided in FIGS. 4B and 5B, as discussed below.

The composite module 230 is configured to generate a composite image of the colored region and the small icon to produce a large icon. In one aspect, the composite module 230 may generate the composite image by placing the small icon within the colored region. For example, the composite module 230 may center the small icon within the colored region in the composite image.

After the large icon is generated, the large icon may be used in place of the original small icon to represent the corresponding website. For example, a computing device may display the large icon within an address bar, a tab or a bookmark of a web browser to represent the corresponding website. In another example, the computing device may display the large icon on a desktop or in an application to provide a shortcut to the corresponding website. The computing device may be a mobile device, such as a smart phone or a tablet. The computing device may comprise a touch screen, in which a user may experience difficulty pointing to and clicking on a small icon using a finger on the touch screen. In this example, the large icon may be used in place of the small icon to provide the user with a larger area to click on using a finger.

In one aspect, the system 200 may reside on a computing device. In this aspect, when the computing device (e.g., mobile devices) receives a small icon for a website, the system 200 may generate a corresponding large icon and instruct the browser of the computing device to use the large icon in place of the small icon to represent the website.

In another aspect, the system 200 may reside on a server that generates the large icon and provides the large icon to a computing device over a network connection. For example, the computing device may provide the small icon to the system 200 over a network connection. In this example, the system 200 may generate a large icon based on the received small icon and send the large icon to the computing device over the network connection. The computing device may then use the large icon to represent the corresponding website. In another example, the computing device may provide an identifier (e.g., URL address) identifying a website to the system 200 over a network connection. In this example, the system 200 may retrieve a small icon corresponding to the identified website, generate a large icon based on the retrieved small icon, and send the large icon to the computing device via the network connection. The compuing device may then use the large icon to represent the corresponding website.

FIG. 4A shows an example of a small icon 155 (e.g., favicon) representing a website. In this example, the small icon 155 is a small heart-shaped icon having a red color.

FIG. 4B shows an example of a large icon 430 generated from the small icon 155 in FIG. 4A. In this example, the color module 210 determines a red color from the small icon 155, e.g., using a clustering algorithm. The colored region module 220 generates a colored region 420 comprising the red color determined by the color module 210. The colored region 220 may also apply a gradient to the red color within the colored region 420. In the example shown in FIG. 4B, the gradient desaturates the red color by an increasing amount in a direction moving from the top 440 of the colored region 420 to the bottom 450 of the colored region 420. As a result, the determined color desaturates or washes out by an increasing amount toward the bottom 450 of the colored region 420.

The composite module 230 generates the large icon 430 by compositing the small icon 155 and the colored region 420. The composite module 230 may center the small icon 155 within the colored region 420, as shown in the example in FIG. 4B. In addition, the composite module 230 may include a frame 425 in the large icon 430 that encloses the colored region 420, as shown in the example in FIG. 4B.

FIG. 5A shows another example of a small icon 510 (e.g., favicon) representing a website. In this example, the small icon 510 is embedded in a white background 515, which may be part of the same image file as the small icon 510.

FIG. 5B shows an example of a large icon 530 generated from the small icon 510 shown in FIG. 5A. In this example, the color module 210 determines a black color from the small icon 510, e.g., using a clustering algorithm. The colored region module 220 generates a colored region 520 comprising the determined black color. In the example in FIG. 5B, the colored region module 220 applies a gradient to the black color within the colored region 520, in which the gradient desaturates the back color by an increasing amount in a direction from top 540 to bottom 550.

The composite module 230 generates the large icon 530 by compositing the small icon 510 including the white background 515 and the colored region 520. In this example, the white background 510 appears as a white box 515 in the large icon 530. The composite module 230 may include a frame 525 in the large icon 530 that encloses the colored region 520, as shown in the example in FIG. 5B.

In one aspect, the composite module 230 may remove the white background 515 before compositing the small icon 510 with the colored region 520. The composite module 230 may accomplish this by converting the white pixels within the white background 515 into transparent pixels so that the white background does not appear in the large icon 530, as shown in the example in FIG. 5C.

In one aspect, the composite module 230 may detect the outer boundary of the small icon 510 in the image comprising the white background 515 and the small icon 510, and convert all of the white pixels in the image surrounding the detected outer boundary of the small icon 510 into transparent pixels. The outer boundary of the small icon 510 may be detected using a variety of techniques. For example, the composite module 230 may detect the outer boundary using an edge detection algorithm that detects sharp discontinuities in pixel values (R, B and G values) between the white background 515 and the outer boundary of the small icon 510. The composite module 230 may also detect the outer boundary using a convex hull algorithm and/or other technique.

Alternatively, the composite module 230 may simply convert all of the white pixels within the image comprising the white background 515 and the small icon 510 into transparent pixels. However, this approach may also make white pixels within the small icon transparent, altering the look of the small icon.

FIG. 6A shows an example of a small icon 610 (e.g., favicon) with multiple colors. In this example, the small icon 610 includes a red region 612, a green region 614, a yellow region 616 and blue regions 618. The green region 614 has the largest area compared with the other regions 612, 616 and 618.

FIG. 6B shows an example of a large icon 630 generated from the small icon 610 shown in FIG. 6A. In this example, the color module 210 determines a green color from the small icon 610 using a clustering algorithm. This is because the green region 614 has the largest area in the small icon 610, making green the dominate color of the small icon 610. The colored region module 220 generates a colored region 620 comprising the green color determined by the color module 210. In this example, the green color within the colored region 620 is desaturated.

The composite module 230 generates the large icon 630 by compositing the small icon 610 and the colored region 620. The composite module 230 may center the small icon 610 within the colored region 620, as shown in the example in FIG. 6B. In addition, the composite module 230 may include a frame 625 in the large icon 630 that encloses the colored region 620, as shown in the example in FIG. 6B.

In one aspect, the color module 210 may determine two or more colors from the small icon 610 instead of one color, and the colored region module 230 may generate a colored region comprising the two or more determined colors. For example, when a clustering algorithm is used, the color module 210 may select the two largest clusters of pixels, and determine the mean color in each of the selected clusters. In another example, the color module 210 may determine the color for each cluster by selecting the color that is shared by the greatest number of pixels in that cluster. The colored region 230 may then generate a colored region comprising the two determined colors.

In one example, the colored region may be divided into two or more sub-regions, where each sub-region comprises one of the determined colors. In this example, the size of each sub-region may be the same. Alternatively, the size of each sub-region may be proportional to the size of the cluster for the corresponding determined color. For example, if the cluster for a first one of the determined colors is twice as large (i.e., twice as many pixels) as the cluster for a second one of the determined colors, then the sub-region for the first determined color may be twice as large as the sub-region for the second determined color.

In certain aspects, the system 200 may be configured to generate a webpage icon, which may be used to represent a particular webpage of a website. A user may access the webpage, e.g., by clicking on the webpage icon. The webpage icon may be displayed in a tab of a web browser or on a desktop to provide a shortcut to the webpage.

In one aspect, the system 200 may generate a webpage icon for a webpage as follows. First, the color module 210 may determine a color from the small icon of the website corresponding to the webpage. The colored region module 220 may then generate a colored region comprising the determined color. The composite module 230 may then acquire a screenshot of the webpage, and generate a composite image of the screenshot and the colored region to produce the webpage icon. The composite module 230 may also include the small icon in the webpage icon.

Figure 7B:
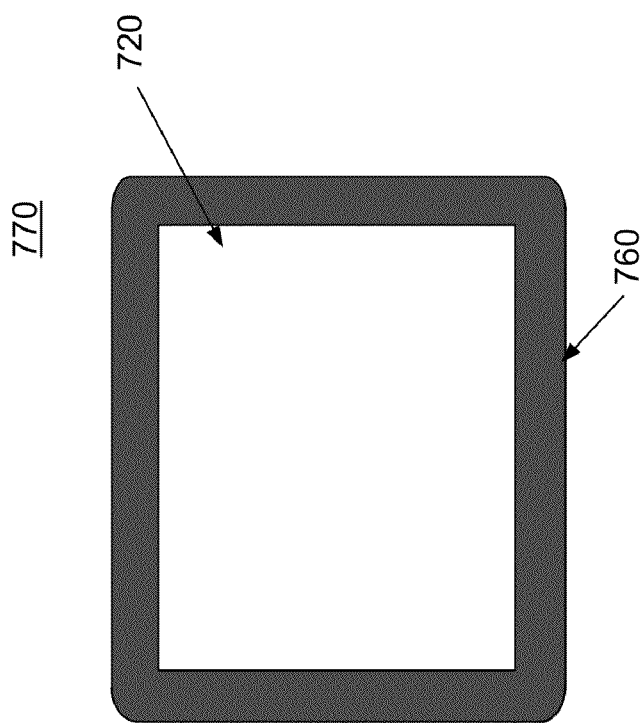
FIG. 7B shows another webpage icon according to an aspect of the subject technology.
Figure 7A:
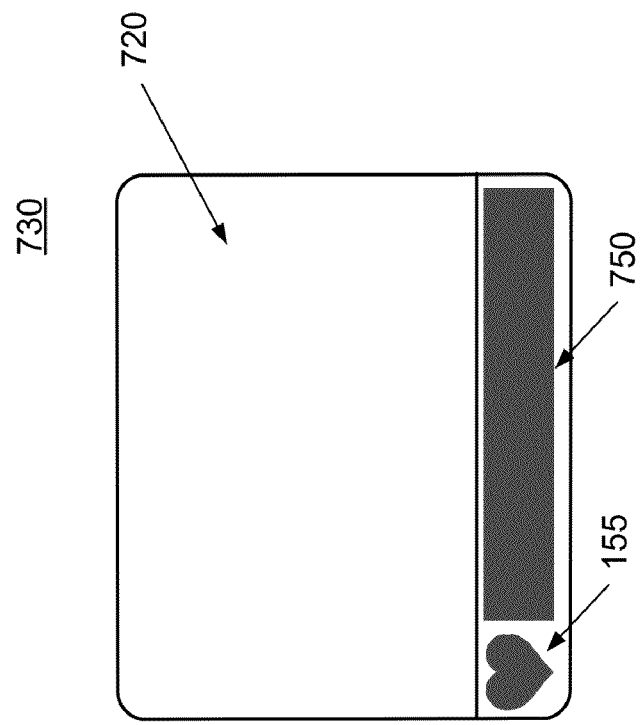
FIG. 7A shows a webpage icon according to an aspect of the subject technology.

FIG. 7A shows an example of a webpage icon 730 comprising a screenshot 720 of the webpage, a colored region 750 and a small icon 155. In this example, the small icon 155 represents the website corresponding to the webpage, and the colored region 750 appears as a stripe of color below the screenshot 720 of the webpage. The colored region 750 helps the user distinguish the webpage icon from webpage icons corresponding to different websites. FIG. 7B shows another example of a webpage icon 770. In this example, the colored region 760 is in the form of a colored border than surrounds the screenshot 720 of the webpage.

A computing device may have a color theme. For example, the color theme may be presented as a dominate color of a background (e.g., desktop background) that is displayed on the computing device. In one aspect, the color module 210 may determine a color from a small icon that most closely matches the color theme of the computing device. For example, the color module 210 may determine two or more colors from the small icon using a clustering algorithm and select the determined color that is closest to the color theme (e.g., in the color space 305). For example, if the color theme comprises a green color, then the color module 210 may select the determined color that is the shortest distance from the green color in the color space 305. This aspect may be used to produce a large icon that is more consistent with the color theme of the computing device.

Figure 8:
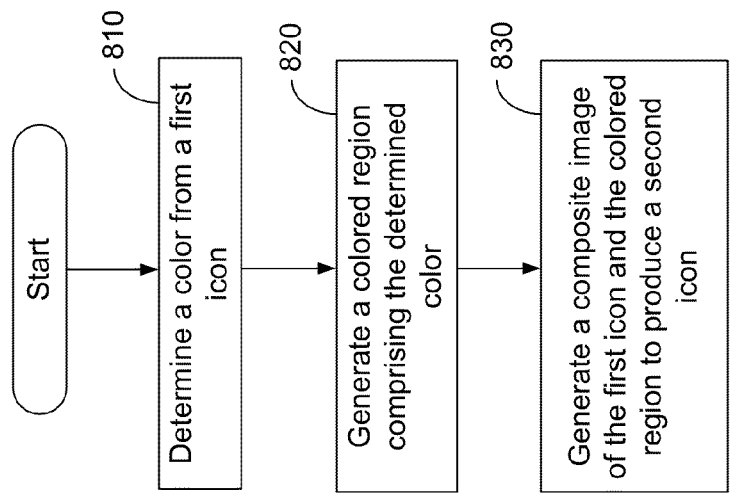
FIG. 8 shows a method for icon generation according to an aspect of the subject technology.

FIG. 8 is a flowchart of a method for icon generation according to an aspect of the subject technology. In step 810, a color is determined from a first icon. The first icon may be a small icon (e.g., a favicon) representing a website. In step 820, a colored region comprising the determined color is generated. One or more attributes of the determined color within the colored region may be adjusted to enhance contrast with the small icon. For example, the determined color within the colored region may be desaturated. Also, a gradient may be applied to the determined color within the colored region. In step 830, a composite image of the colored region and the first icon is generated to produce a second icon. The second icon is larger than the first icon. For example, the second icon may be 50% or more larger than the first icon (e.g., comprise 50% more pixels). In another example, the second icon may be 100% or more larger than the first icon (e.g., comprise 100% more pixels). For the example where the first icon is a small icon representing a website, the second icon may be used in place of the first icon to represent the website.

Figure 9:
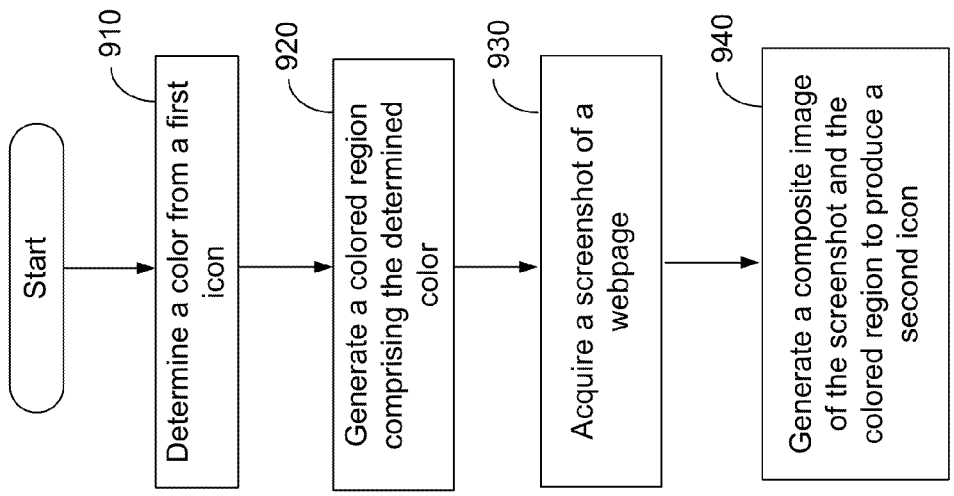
FIG. 9 shows a method for icon generation according to another aspect of the subject technology.

FIG. 9 is a flowchart of a method for icon generation according to another aspect of the subject technology. In step 910, a color is determined from a first icon. The first icon may be a small icon (e.g., a favicon) representing a website. In step 920, a colored region comprising the determined color is generated. In step 930, a screenshot of a webpage is acquired. For the example in which the first icon is a small icon representing a website, the webpage may be a webpage from the website. In step 940, a composite image of the colored region and the screenshot is generated to produce a second icon.

Figure 10:
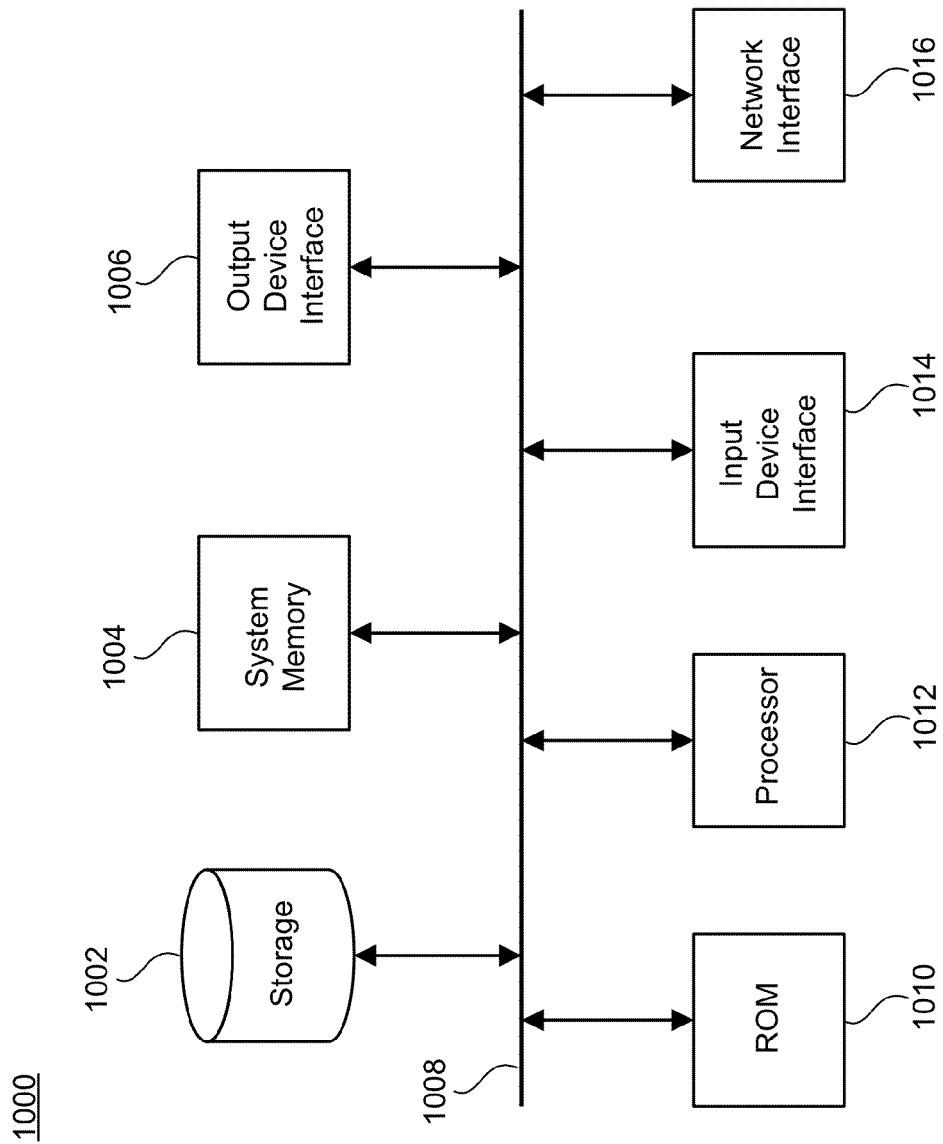
FIG. 10 conceptually illustrates an electronic system with which some implementations of the subject technology may be implemented.

FIG. 10 conceptually illustrates an electronic system with which some implementations of the subject technology may be implemented. For example, the electronic system may be used to implement the system 200 illustrated in FIG. 2. Electronic system 1000 includes a bus 1008, processing unit(s) 1012, a system memory 1004, a read-only memory (ROM) 1010, a permanent storage device 1002, an input device interface 1014, an output device interface 1006 and a network interface 1016.

Bus 1008 collectively represents all system, peripheral, and chipset buses that communicatively connect the numerous internal devices of electronic system 1000. For instance, bus 1008 communicatively connects processing unit(s) 1012 with ROM 1010, system memory 1004, and permanent storage device 1002.

From these various memory units, processing unit(s) 1012 retrieves instructions to execute and data to process in order to execute the processes of the subject disclosure. For example, each module in the system 200 may include instructions that are stored in one or more of the memory units and executed by the processing unit(s) 1012 to implement the processes of the module. The processing unit(s) can be a single processor or a multi-core processor in different implementations.

ROM 1010 stores static data and instructions that are needed by processing unit(s) 1012 and other modules of the electronic system. Permanent storage device 1002, on the other hand, is a read-and-write memory device. This device is a non-volatile memory unit that stores instructions and data even when electronic system 1000 is off. Some implementations of the subject disclosure use a mass-storage device (such as a magnetic or optical disk and its corresponding disk drive) as permanent storage device 1002.

Other implementations use a removable storage device (such as a floppy disk, flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such a random access memory. System memory 1004 stores some of the instructions and data that the processor needs at runtime. In some implementations, the processes of the subject disclosure are stored in system memory 1004, permanent storage device 1002, and/or ROM 1010. From these various memory units, processing unit(s) 1012 retrieves instructions to execute and data to process in order to execute the processes of some implementations.

Bus 1008 also connects to input and output device interfaces 1014 and 1006. Input device interface 1014 enables the user to communicate information and select commands to the electronic system. Input devices used with input device interface 1014 include, for example, alphanumeric keyboards and pointing devices (also called "cursor control devices"). Output device interfaces 1006 enables, for example, the display of images generated by the electronic system 1000. Output devices used with output device interface 1006 include, for example, printers and display devices, such as cathode ray tubes (CRT) or liquid crystal displays (LCD).

Finally, as shown in FIG. 10, bus 1008 also couples electronic system 1000 to a network (not shown) through a network interface 1016. In this manner, the electronic system 1000 can be a part of a network of computers (such as a local area network ("LAN"), a wide area network ("WAN"), or an Intranet, or a network of networks, such as the Internet. Any or all components of electronic system 1000 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for providing access to a webpage, comprising:
   receiving a first icon over a network, wherein the first icon represents a website and the first icon is configured for display within at least one of an address bar, a tab, and a bookmark of a web browser;
   determining a color from the first icon using a computer;
   generating a colored region comprising the determined color;
   downloading the webpage from the website represented by the first icon;
   acquiring a screenshot of the webpage;
   generating a composite image of the colored region and the screenshot to produce a second icon; and
   displaying the second icon in the web browser to provide a user with access to the webpage.

2. The method of claim 1, wherein generating the composite image comprises generating a composite image of the colored region, the screenshot, and the first icon to produce the second icon.

3. The method of claim 1, wherein determining the color from the first icon comprises applying a clustering algorithm to pixels of the first icon.

4. The method of claim 3, wherein the clustering algorithm groups the pixels of the first icon into a plurality of clusters based on colors of the pixels, and wherein determining the color of the first icon comprises:
   selecting a cluster from the plurality of clusters having a largest number of pixels; and
   determining the color of the first icon based on the colors of the pixels in the selected cluster.

5. The method of claim 4, wherein determining the color of the first icon based on the colors of the pixels in the selected cluster comprises computing a mean of the colors of the pixels in the selected cluster.

6. The method of claim 1, wherein the second icon is displayed in a tab of the web browser.

7. A system for providing access to a webpage, the system comprising:
   one or more processors; and
   a machine-readable medium comprising instructions stored therein, which when executed by the one or more processors, cause the one or more processors to perform operations comprising:
      receiving a first icon over a network, wherein the first icon represents a website and the first icon is configured for display within at least one of an address bar, a tab, and a bookmark of a web browser;
      determining a color from the first icon;
      generating a colored region comprising the determined color;
      downloading the webpage from the website represented by the first icon;
      acquiring a screenshot of the webpage;
      generating a composite image of the colored region, the first icon and the screenshot to produce a second icon; and
      displaying the second icon on a computing device to provide a user with a shortcut to the webpage.

8. A non-transitory machine-readable medium comprising instructions stored therein, which when executed by a machine, cause the machine to perform operations comprising:
   receiving a first icon over a network, wherein the first icon represents a website and the first icon is configured for display within at least one of an address bar, a tab, and a bookmark of a web browser;
   determining a color from the first icon;
   generating a colored region comprising the determined color;
   downloading a webpage from the website represented by the first icon;
   acquiring a screenshot of the webpage;
   generating a composite image of the colored region, the screenshot and the first icon to produce a second icon; and
   displaying the second icon in the web browser to provide a user with access to the webpage.

* * * * *